United States Patent [19]

Donatti et al.

[11] Patent Number: 5,233,022

[45] Date of Patent: Aug. 3, 1993

[54] FLOW PROPERTY SHELF LIFE OF PVC DRY BLEND POWDERS

[75] Inventors: Joseph T. Donatti, Iowa City; Robert P. Cavender, Coralville; Robert J. Stein, Iowa City; James Carter, North Liberty, all of Iowa

[73] Assignee: United Technologies Automotive, Inc., Dearborn, Mich.

[21] Appl. No.: 749,751

[22] Filed: Aug. 26, 1991

[51] Int. Cl.⁵ .............................. C08F 6/00; C08J 3/20
[52] U.S. Cl. ..................................... 528/503; 526/344
[58] Field of Search ................. 528/503, 483, 492; 526/344

[56] References Cited

U.S. PATENT DOCUMENTS 4,107,421  8/1978  Scamehorn et al. ............... 528/483

Primary Examiner—Joseph L. Schofer
Assistant Examiner—Tom Weber
Attorney, Agent, or Firm—George J. Romanik

[57] ABSTRACT

A method of cooling a PVC dry blend powder in a vessel by spraying a liquified inert gas into the vessel such that the liquified inert gas contacts the powder. The PVC dry blend powder is made by mixing a powdered PVC resin with ingredients selected from the group consisting of plasticizers, stabilizers, and pigments in a mixing vessel by using a heating and mixing cycle followed by a liquified inert gas cooling cycle. The flow properties of PVC dry blend powder made by this method have an improved shelf life.

5 Claims, 1 Drawing Sheet

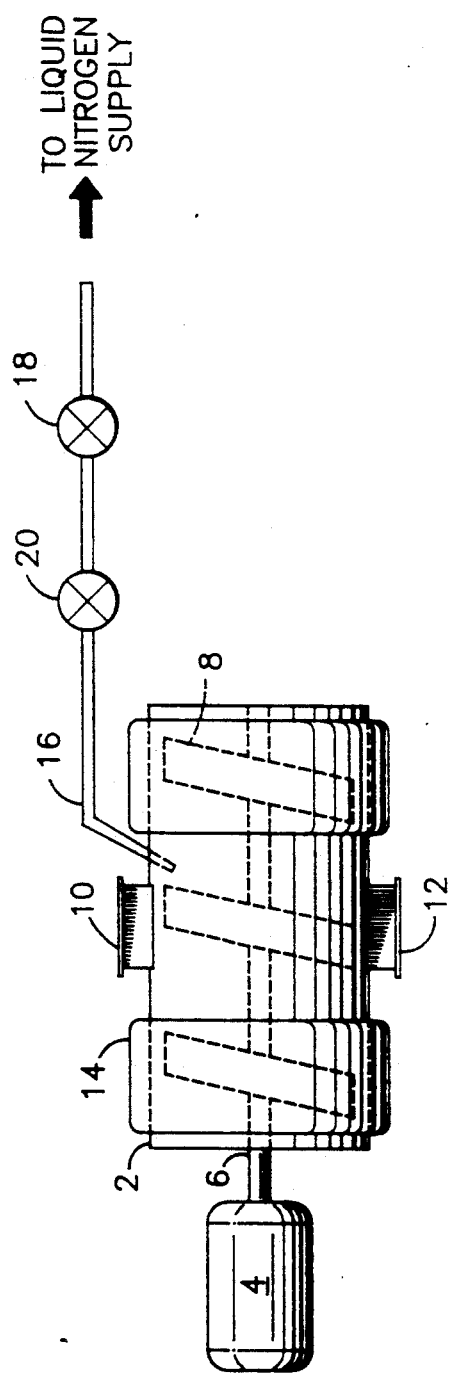

FLOW PROPERTY SHELF LIFE OF PVC DRY BLEND POWDERS

DESCRIPTION

1. Technical Field

The present invention is directed towards improving the shelf life of flow properties of PVC dry blend powders.

2. Background Art

Polyvinyl chloride dry blend powders are commonly used in slush molding processes to make vinyl parts for the motor vehicle and other industries. Motor vehicle parts made from PVC dry blend powders include instrument panels, door panels, nose pads, and other padded products.

Slush molding is a process used to form a vinyl skin of a desired shape and thickness on the surface of a hot mold. At the start of the process, a charge box holding a supply of PVC dry blend powder sufficient to make several hundred parts, usually about 1,000 pounds, is suspended below a heated mold. The charge box is clamped to the mold and both the charge box and mold are rotated in two planes so the powder falls onto the surface of the mold in a uniform manner. Upon contacting the surface of the mold, some of the powder partially fuses to coat the mold surface. After the coating has formed, the container and mold are rotated to their original position so the unused, unfused powder falls back into the charge box. The charge heated to a temperature sufficient to fuse the coating fully into a skin of the desired shape and thickness. As a result of sequential contact with a series of hot molds, the PVC dry blend powder in the charge box reaches an equilibrium temperature, which may be between about 100° F. and about 130° F. Maintaining the powder at the equilibrium temperature helps ensure that the powder flows evenly over the mold surface. As the powder in the charge box is depleted, additional powder is automatically added, often by vacuum transfer from a storage container, to ensure that the charge box contains at least 75% of it capacity.

The quality of parts made by this process depends on several factors, including the flow properties of the PVC dry blend powder. The flow properties of the PVC dry blend powder depend on the components used to compound it, the conditions under which it was compounded, and the temperature at which it is mixed into the charge box. To produce good quality parts the PVC dry blend powder should be free flowing rather than tacky and finely powdered rather than clumped into large lumps. Moreover, fresh powder added to the charge box should be at a temperature near or below the equilibrium temperature to ensure that the powder flows evenly over the mold surface. In general, powder added to the charge box at lower-temperatures, such as between about 80° F. to about 110° F., performs better than powder added at higher temperatures.

PVC dry blend powders are made by mixing a powdered PVC resin with various liquid and powdered ingredients, such as plasticizers, stabilizers, and pigments, using compounding methods well known in the industry. Typically, the PVC resin is mixed with the liquid and powdered ingredients in a jacketed mixing vessel during a heating and mixing cycle that is followed by a cooling cycle. During the heating and mixing cycle, the materials in the vessel may be heated to about 170° F. to about 200° F. During the cooling cycle, the PVC dry blend powder is cooled and dropped out of the mixer. The cooling cycle may occur in the same vessel used for the heating and mixing cycle or in a separate cooling vessel. Heat is supplied by circulating a hot fluid, such as hot water, through the jacket. The powder is cooled by circulating a cold fluid, such as cold water, though the jacket. Due to heat transfer and cycle time limitations, the temperature of the PVC dry blend powder dumped out of the mixing vessel is typically between about 140° F. and about 200° F.

PVC dry blend powder made by conventional methods can suffer from two drawbacks. First, at the temperatures ir is dumped from the mixer, the powder is often tacky and does not flow freely. Moreover, the powder is often substantially hotter than the equilibrium temperature of the powder in the slush mold machine charge box. As a result, the powder cannot be used for slush molding until it cools and stabilizes, that is, loses its tackiness. The need to cool batches of powder after compounding can result in excess powder inventory and can lead to operator confusion if the warm powder is not properly segregated from the cooled powder. Second, the flow properties of the powder may have a short shelf life. For example, when stored at ambient temperature for periods of more than about 48 hours, the powder tends to agglomerate into hard lumps that are incompatible with the slush molding process. The lumps can make it difficult to transfer fresh powder to the charges box because they may plug vacuum transfer lines. In addition, the lumps can keep the powder from being properly distributed over the inside surface of the mold, leading to parts of unacceptable quality. As a result, powders that are stored for longer than 48 hours must be screened or otherwise processed to break up the lumps. This additional processing can entail large amounts of time and labor. Taken together, the need to cool the powder before use and the degradation of the powder's flow properties over time limit the useful life of the powder.

Accordingly, it would be desirable to have a method of producing a PVC dry blend powder that can be used shortly after compounding and can be stored for long periods without its flow properties deteriorating.

DISCLOSURE OF THE INVENTION

The present invention is directed towards a method of producing a PVC dry blend powder that can be used shortly after compounding and can be stored for long periods without its flow properties deteriorating.

One aspect of the invention includes a method of cooling a PVC dry blend powder in a vessel by spraying a liquified inert gas into the vessel such that the liquified inert gas contacts the powder. The PVC dry blend powder is made by mixing a powdered PVC resin with ingredients selected from the group consisting of plasticizers, stabilizers, and pigments in a mixing vessel by using a heating and mixing cycle followed by a liquified inert gas cooling cycle. The PVC dry blend powder made by this method has an improved flow property shelf life.

Another aspect of the invention includes a PVC vinyl part made by slush molding a PVC dry blend powder made by the above method.

The foregoing and other features and advantages of the present invention will become more apparent from the following description and accompanying drawing.

BRIEF DESCRIPTION OF THE DRAWING

The FIGURE is a partially cut away plan view of a single chamber, jacketed mixing vessel adapted to permit a liquified inert gas to be sprayed into the vessel.

BEST MODE FOR CARRYING OUT THE INVENTION

The method of the present invention is compatible with any PVC dry blend powder compounding method that incorporates a cooling cycle. It is also compatible with any raw materials, including PVC resins, plasticizers, stabilizers, pigments, dry up resins, and other materials, that may be used to compound PVC dry blend powders. The liquified inert gas may be any liquified gas that is cold enough to rapidly and uniformly cool the PVC dry blend powder without reacting with it. Liquid nitrogen, the preferred liquified inert gas, will be used to describe the invention throughout this application.

The present invention includes spraying liquid nitrogen directly into a mixing or cooling vessel that contains a PVC dry blend powder to cool the powder. The liquid nitrogen boils on contact with the powder, providing the desired cooling as it absorbs a latent heat of vaporization. Because the boiling nitrogen disperses readily through the powder, cooling is uniform and rapid. Neither the amount of liquid nitrogen used nor the method used to introduce the nitrogen into the mixing or cooling vessel is critical. It may be convenient to spray the nitrogen into the vessel at a pressure between about 30 psig and about 45 psig, although no particular pressure is required. While the rate of liquid nitrogen addition is not significantly limiting, it should be adequate to cool the PVC dry blend powder to a desired temperature, for example about 100° F. to about 130° F., in less than about 20 minutes. Preferably, the rate of nitrogen addition will be sufficient to cool the powder to the desired temperature in less than about 10 minutes. To accelerate the rate of cooling, the liquid nitrogen can be supplemented by circulating a cold fluid through a jacket of the mixing or cooling vessel. However, supplemental cooling is not required for the present invention to be effective.

Any system capable of spraying liquid nitrogen into a mixing or cooling vessel containing PVC dry blend powder may be used to practice the present invention. The FIGURE depicts one such system. A conventional, single-chamber mixing vessel 2 is provided with a motor 4 connected by a shaft 6 to a plurality of mixing blades 8. The vessel also may have an agitator (not shown) and a chopper (not shown) as is common in the industry. The vessel has a charge port 10 and a drop port 12 for adding and removing raw material and finished product, respectively. The vessel is surrounded by a jacket 14, which is capable of circulating either a hot fluid or a cold fluid around the vessel. Fluid flow through the jacket is controlled by a temperature controller (not shown). A tube 16 connected to a liquid nitrogen supply permits liquid nitrogen to be sprayed into the interior of the vessel 2. The nitrogen flow is controlled with an on/off valve 18 and a metering valve 20. Gaseous nitrogen is permitted to escape through the charge port 10, which is left open during the cooling cycle. To prevent any powder from escaping, the charge port 10 is covered with a fine cloth filter while it is open. The filter was a mesh size suitable to prevent the powder from escaping.

The following example is given to demonstrate the present invention without limiting the invention's broad scope.

EXAMPLE

The flow of hot water through the jacket of a single chamber, jacketed mixing vessel was started and a PVC resin powder was added to the vessel through the charge port. The charge port lid was closed and the mixer and chopper motors were started. The resin was mixed until it reached 170° F. Once the resin was at 170° F., liquid plasticizers and stabilizers were added to the vessel at a rate of 1 pound in 22 seconds. Mixing continued until the material reached a temperature of 196° F. When the material reached 196° F., the charge port was opened and a pigment, solid stabilizer, and a nitrile rubber were added to the vessel. A fine cloth filter was then fitted over the charge port, which was left open. Mixing continued until the materials reached 200° F. At 200° F., the chopper motor was turned off and liquid nitrogen was sprayed into the vessel. When the temperature in the vessel reached 170° F., the nitrogen addition was stopped, the charge port was opened, and a powdered dry up resin was added to the vessel. The chopper motor was then run for 1.5 minutes to blend the dry up resin with the rest of the material. The filter was fitted over the charge port and the nitrogen flow was restarted. The nitrogen flow was maintained until the temperature in the vessel reached 110° F., which took about 5 to 10 minutes. The mixer motor was then shut off and the PVC dry blend powder was dumped into a drum.

PVC dry blend powder made by the present invention flows readily and is not tacky when it is dumped from the mixer. Moreover, its temperature is close to typical equilibrium temperatures in slush molding machine charge boxes. Therefore, it is suitable for use within about 2 hours or less after compounding. By contrast, PVC dry blend powder made by prior art methods requires about 72 hours of additional cooling before use.

The PVC dry blend powder made by the present invention also does not tend to agglomerate into hard lumps after long periods of storage. In particular, powder made by the present invention has been stored for more than 180 days without any appreciable lumps forming. In general use, the recommended maximum storage time is about 90 days. By contrast, PVC dry blend powder made by prior art methods has a shelf life of no more than about 10 days.

These two improvements in flow properties make the PVC dry blend powders made by the present invention more versatile than prior art powders. As a result, the powders made by the present invention can provide an opportunity to optimize powder compounding and slush molding operations.

One skilled in the art will understand that the method of compounding the PVC dry blend powder described herein in only exemplary and that the present invention is suitable for use with any PVC dry blend powder compounding method that requires cooling. In fact, one skilled in the art also will realize that the method of the present invention may be used with any solid or powder mixing process that requires the use of cooling.

It should be understood that the invention is not limited to the particular embodiments shown and described herein, but that various changes and modifications may be made without departing from the spirit or scope of the claimed invention.

We claim:

1. A method of making a PVC dry blend powder having improved flow property shelf life comprising, mixing a powdered PVC resin with ingredients selected from the group consisting of plasticizers, stabilizers, and pigments in a mixing vessel by using a heating and mixing cycle followed by a cooling cycle, wherein the improvement comprises:

spraying a liquified inert gas into the vessel during the cooling cycle such that the liquified inert gas contacts the PVC dry blend powder, thereby cooling the PVC dry blend powder and producing a PVC dry blend powder having an improved flow property shelf life.

2. The method of claim 1 wherein the liquified inert gas is sprayed into the vessel at a rate sufficient to cool the PVC dry blend powder to between about 100° F. and about 130° F. in less than about 20 minutes.

3. The method of claim 1 wherein a cold fluid is circulated through a jacket surrounding the vessel during the cooling cycle to supplement the cooling provided by the liquified inert gas.

4. The method of claim 1 wherein the liquified inert gas is liquid nitrogen.

5. A PVC vinyl part made by slush molding a PVC dry blend powder made by the method of claim 1.